May 6, 1958 R. A. MacDONALD 2,832,973
MANUFACTURE OF ACORN NUTS
Filed June 13, 1956 5 Sheets-Sheet 1
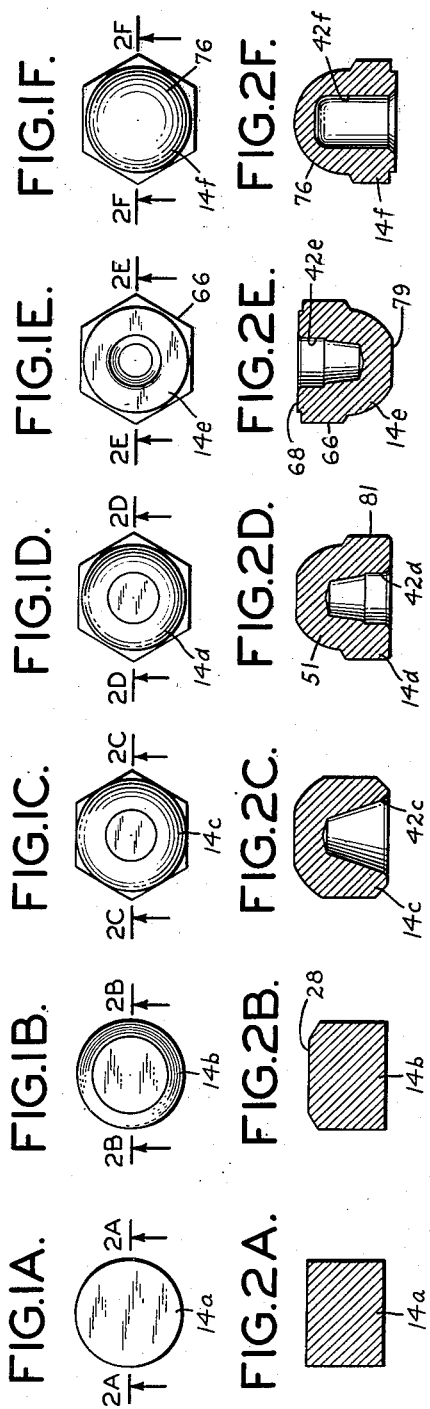
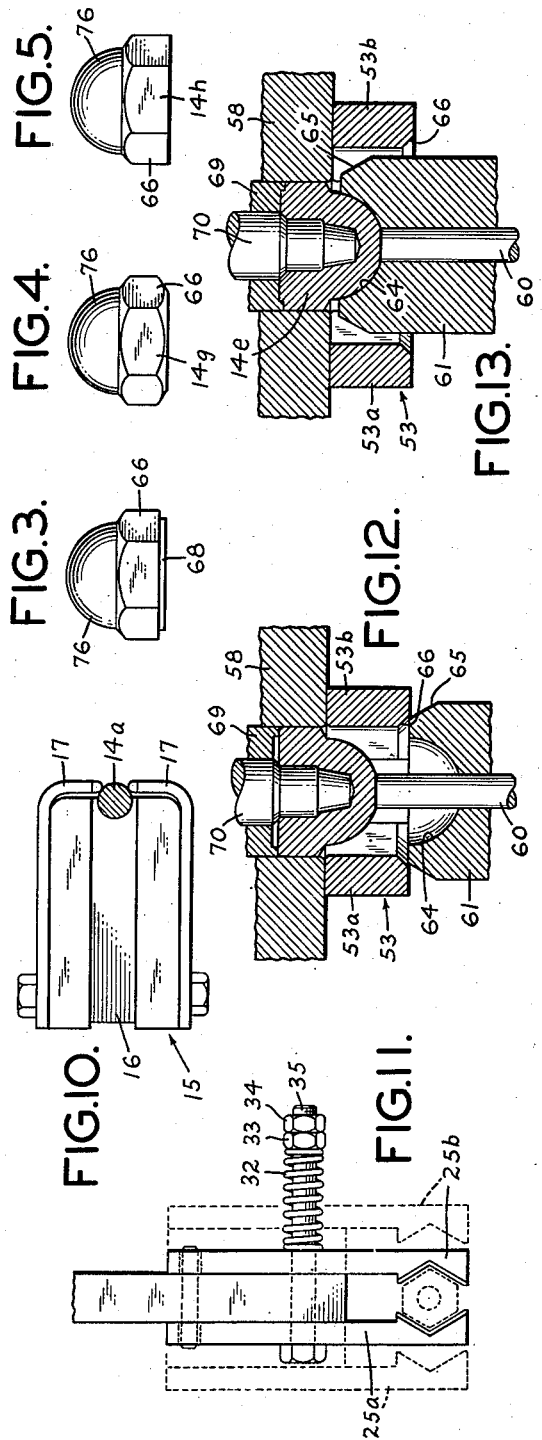

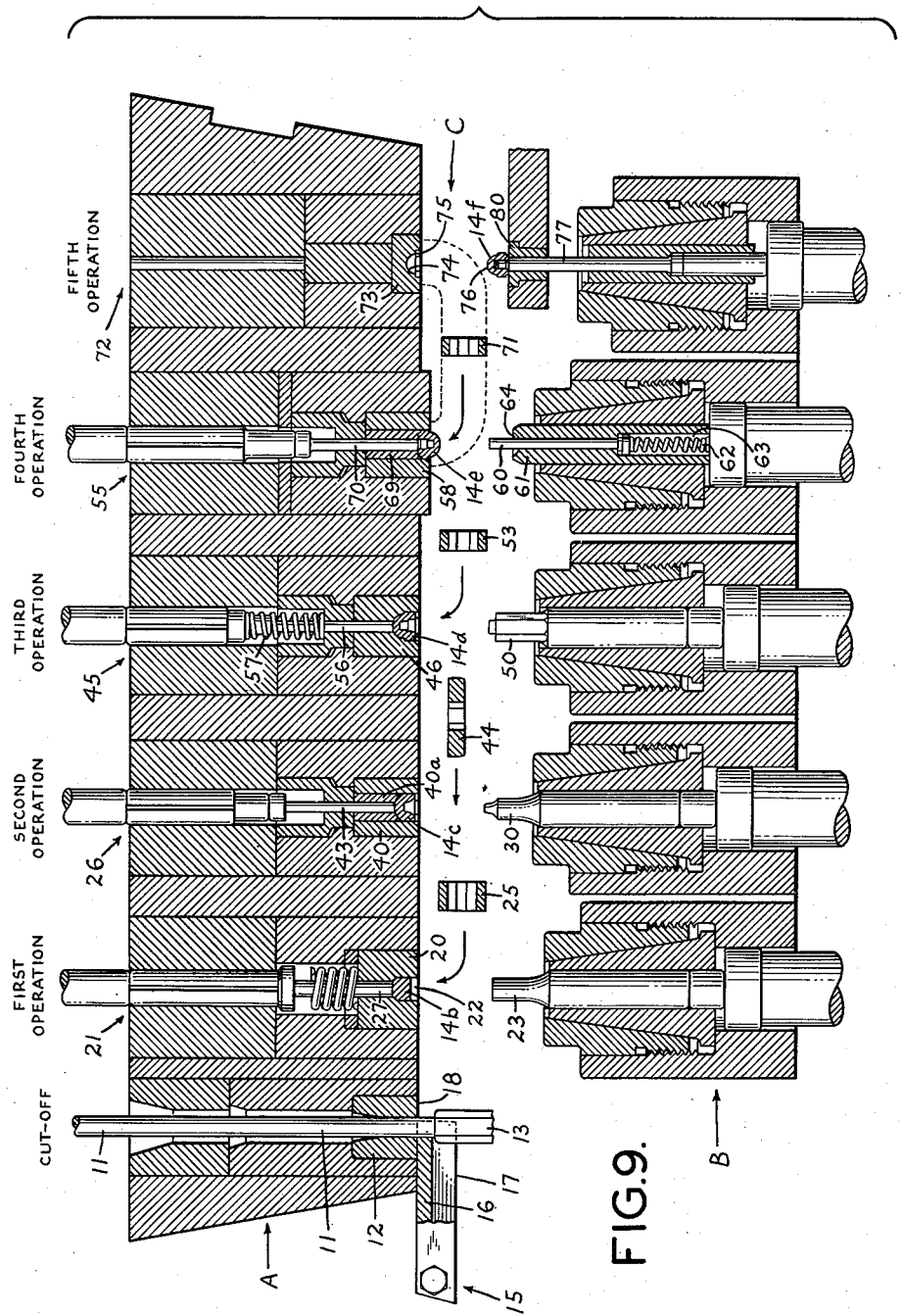

2,832,973

MANUFACTURE OF ACORN NUTS

Roderic A. MacDonald, Greenwich, Conn., assignor to Russell, Burdsall & Ward Bolt and Nut Co., Port Chester, N. Y., a corporation of New York Application June 13, 1956, Serial No. 591,211

5 Claims. (Cl. 10—86)

This invention relates to nuts and more particularly to the manufacture of steel acorn nuts.

There have been proposals in prior patents for manufacturing acorn nuts by various means and methods, but so far as I am aware none of the proposals have met with practical success in producing steel acorn nuts on nut formers which operate on cold stock. Such nut formers are sometimes referred to as cold nut formers. In some prior proposals difficulties are encountered in obtaining uniform wall thickness of the cap or domed part of the nut, or there is a tendency of the punches to punch through the dome-shaped wall. Also, in some of the prior proposals, the outside surface of the finished nut was not smooth, but had a circular, flat surface at the outermost end of the dome. This renders the nut unsatisfactory for certain purposes; especially, where the acorn nut is to be used in a decorative as well as a serviceable way.

My invention provides a method by which acorn nuts may be made by cold forging operations performed on cold nut forming machines, suitably modified to carry out the steps hereinafter described in detail.

Although the novel features which are believed to be characteristic of the invention are pointed out in the annexed claims, the invention, as to its objects and advantages and the manner in which it may be carried out, may be better understood by reference to the following description taken in connection with the accompanying drawings forming a part hereof, in which Figs. 1A to 1F, inclusive, are plan views of the blank in various stages of the manufacture of the acorn nut blank from the starting cylindrical slug to the finished nut blank.

Figs. 2A to 2F inclusive are cross sectional views of the blank in progressive stages, corresponding to Figs. 1A to 1F respectively;

Fig. 3 is a view in elevation of washerface acorn nut made according to the invention;

Fig. 4 is a view in elevation of a double chamfered acorn nut made according to the invention;

Fig. 5 is a view in elevation of a flat face acorn nut, made according to the invention;

Fig. 9 is a view similar to Figs. 6, 7, and 8 but showing the position of the parts when the punches have proceeded halfway in their return or rearward stroke in the cycle;

Fig. 10 is a view to illustrate the cut-off mechanism;

Fig. 11 is a view to illustrate the transfer fingers;

Fig. 12 is a view to larger scale than Figs. 6, 7, 8, 9 showing the die, punch, and transfer finger mechanism at the fourth operation station; and Fig. 13 is a view similar to Fig. 12 but showing the punch at the end of its forward stroke.

Figure 6:
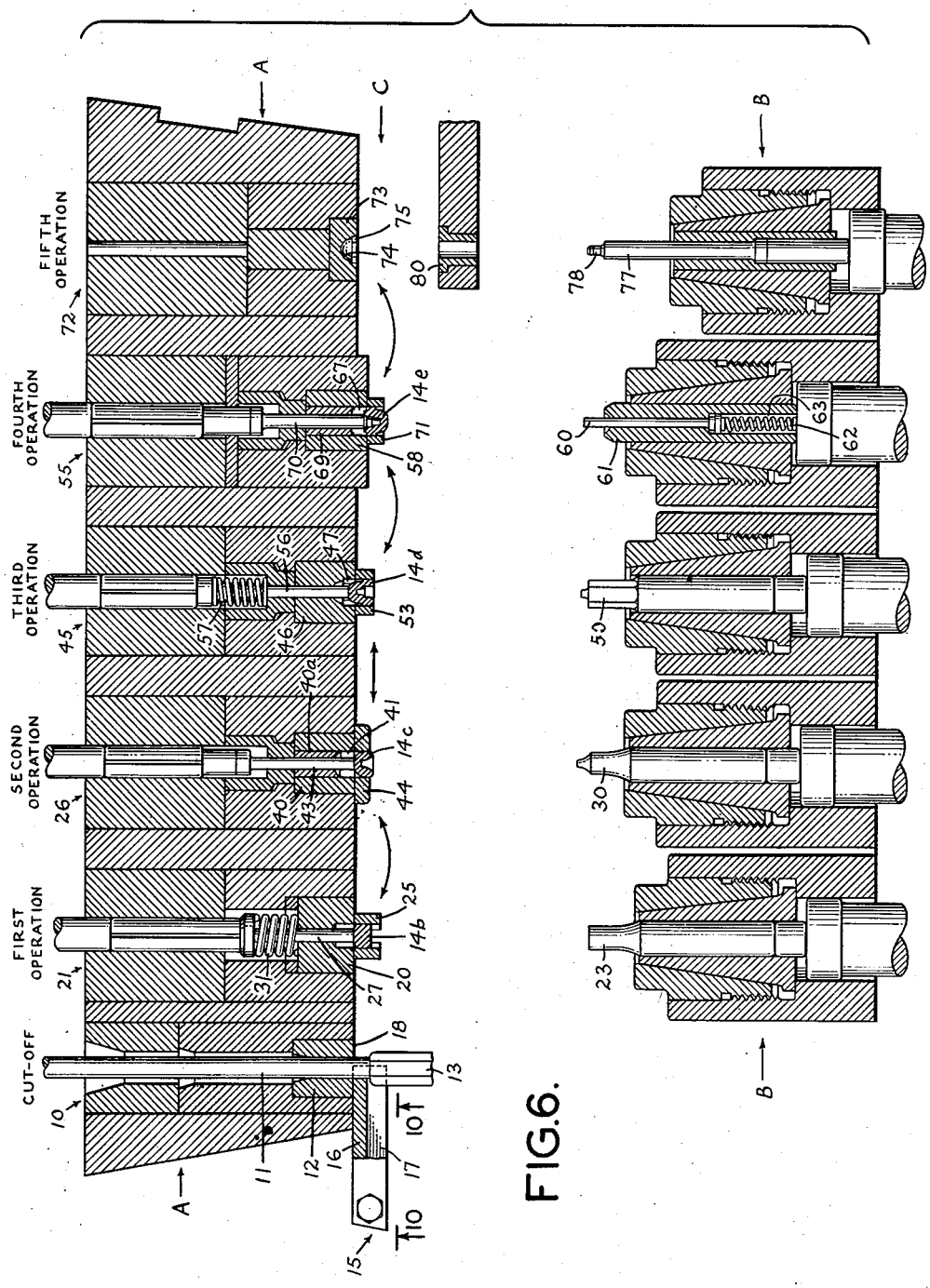
Fig. 6 is a view in horizontal cross section of the applicable parts of a cold header or nut forming machine showing the forming dies and punches, said view being partly diagrammatic and showing the relative positions of the parts at the beginning of a forward stroke or at the end of the rearward stroke of the punches in the operation of the cycle of operations forming the nut.

Referring now to the drawings in which like reference characters indicate similar parts throughout the several views, the machine, known as a cold nut former, comprises a die block A accommodating a cut-off station, and five operation stations, a heading gate B accommodating five punches, and transfer mechanism having revolving finger holders and non-revolving finger holders. Such a machine is available and it will be understood that the punches, knock out pins, cut-off device, stripper, and punches on the machine, operate in timed relation and that at each station in each cycle of the machine there is a blank being operated upon in progressive stages of completion, so that a finished nut blank is discharged from the machine with each full stroke or cycle of the machine.

In the following description the steps of the method which characterize the invention will be described by following a blank from the time it is cut from a bar of stock, through the various subsequent steps, but it will be understood that as this blank progresses one station at each full stroke or cycle of the machine, from the first to the last station, there are blanks in each of the other stations being acted upon at each station in their course of travel through the machine.

Figure 7:
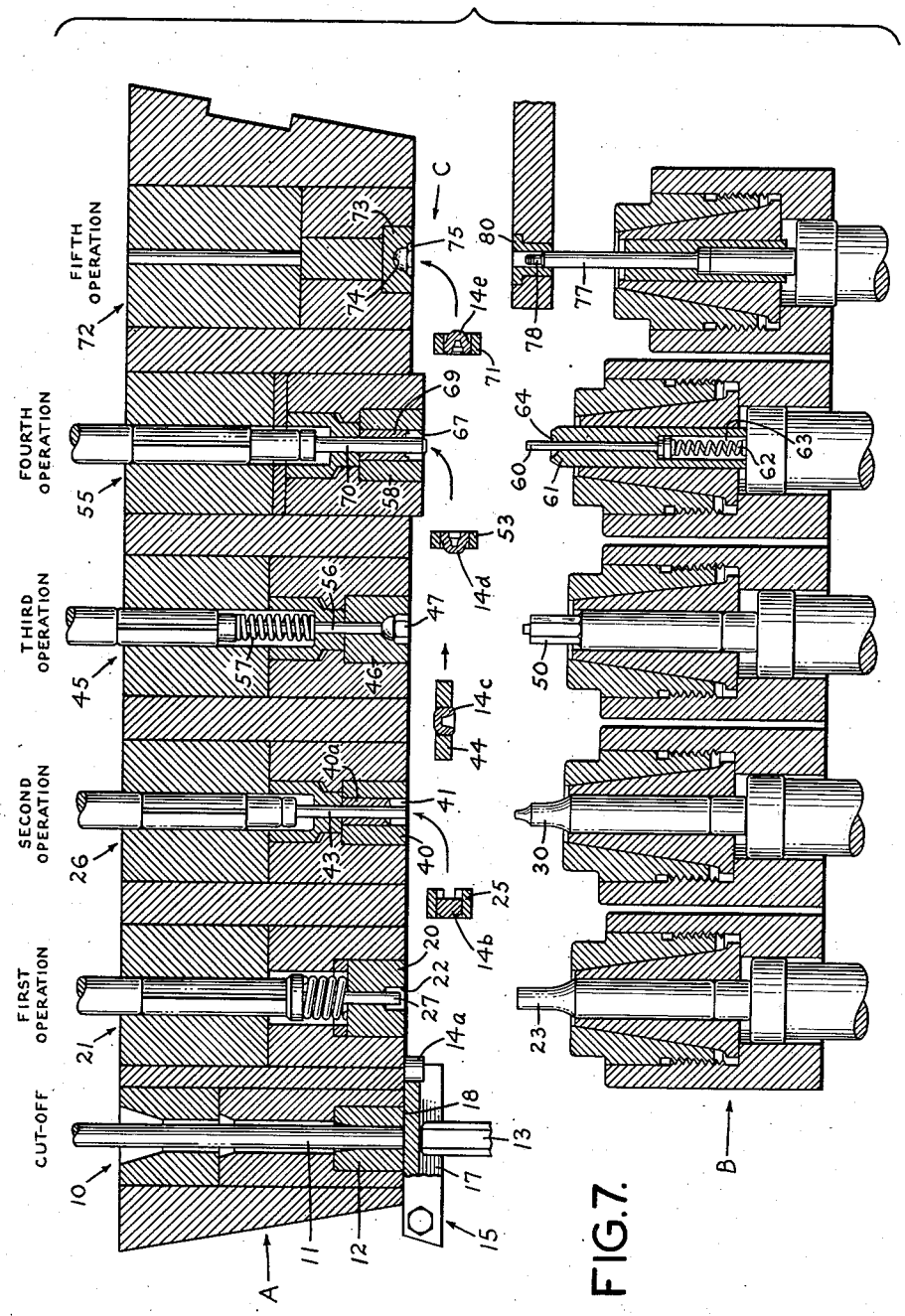
Fig. 7 is a view similar to Fig. 6 but showing the position of the parts after the punches have proceeded halfway in their forward stroke in the cycle.

At the station 10 designated "cut-off," a round wire or bar of steel 11, of the kind utilized to make cold forged steel nuts, is fed through the die 12 in die block A until it is stopped by engagement with a pin 13 called a "wire stop." This pin 13, as known to those skilled in the art, may be adjustable so that a blank 14a of desired length, may be cut off at each stroke of the machine by a reciprocating cut-off mechanism 15 having a cut-off knife 16 and blank holding fingers 17. This cut-off knife is actuated by mechanism of conventional construction and moves across the face 18 of the cut-off die 12, thus shearing off a cylindrical blank 14a. This sheared off blank 14a is carried to a position opposite the first operation die 20 at station 21 labeled "1st Oper." It will be understood that cutting mechanism 15 is timed to cut and carry the blank 14a to the first operation die 20 while the gate B, mounting the punches, is moving in its forward stroke, and while the transfer fingers 17 are moving to the right, as indicated in Fig. 7.

The cut-off mechanism 15 positions the blank 14a in front of the "first operation" die 20 so that the first operation punch 23 on its forward stroke pushes the blank 14a into the die cavity 22 of die 20. Here the die blank 14a is subjected to a considerable pressure, and takes the form shown in Figs. 1B and 2B, and for convenience of description is herein designated by reference character 14b.

The purpose of this first forging operation is to size the blank by pressing it into close contact with the die, and this removes irregularities of the end faces of the blank 14a which may have resulted from the shearing action of the cutting mechanism 15. Also, this first forging operation removes non-uniformities that may have existed in the wire stock 11.

Figure 8:
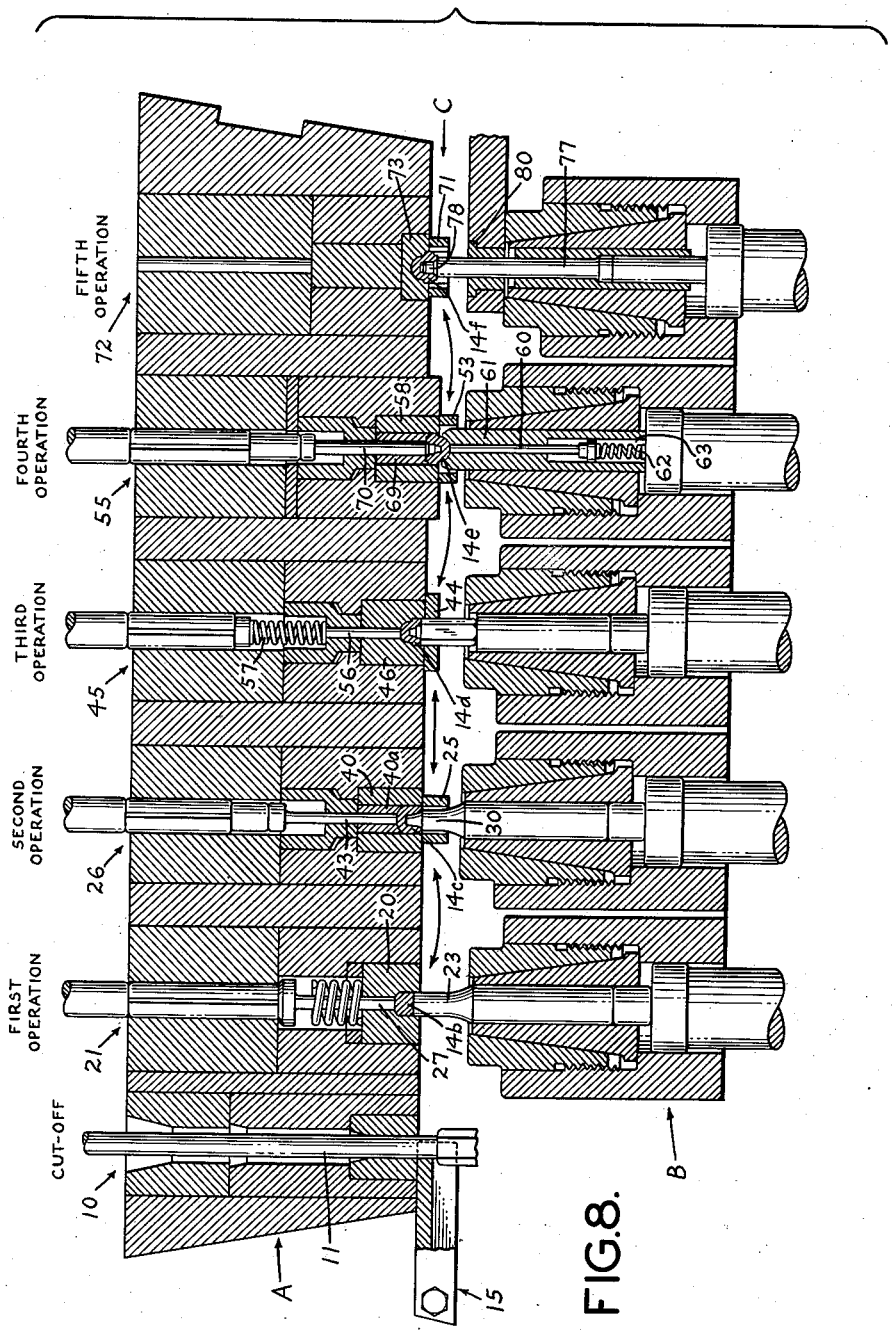
Fig. 8 is a view similar to Figs. 6 and 7 but showing the position of the parts at the end of the forward stroke of the punches.

After the completion of this first forging operation, that is, when the punch 23 has completed its forward stroke and takes the position shown in Fig. 8, the punch is then retracted on the rearward stroke of the punch 23 and the blank 14b is ready to be knocked out of the die cavity 22 of die 20. This, however, cannot occur until the transfer fingers 25 (operating between the first and second operating stations 21 and 26) are in pick-up position, as shown in Fig. 6.

When the transfer fingers 25 are in pick-up position (see Fig. 6), the knock-out pin 27 at the first operation station 21, is actuated and pushes the blank 14b into the transfer fingers 25, which grasp the blank 14b. It is to be particularly noted here that transfer fingers 25 are mounted on the machine to revolve so that the face 28 of blank 14b acted upon by the knock-out pin 27 is rotated 180° in its travel from station 21 to station 26 so that the bevelled face 28 is engaged by the punch 30 in the second forging operation. As shown in Figs. 6 to 9 the knock-out pin 27 is provided with a cushioning compression spring 31, which also acts in retracting the pin after it has pushed the blank 14b out of the die 20.

A typical set of transfer fingers is shown in Fig. 11 wherein it will be noted that the pair of complementary fingers 25a and 25b are movable in a direction away from each other against the force of a helical compression spring 32 which normally urges the fingers 25a and 25b toward each other, the spring tension being adjustable by means of nuts 33, 34 screwed upon a bolt 35.

After the blank has been grasped in the fingers 25 at station 21, the punches in gate B are ready to start a forward stroke (as indicated in Fig. 6). The blank 14b, having been grasped by the transfer fingers 25, the knock-out pin 27 retracts under the action of the spring 31. The transfer fingers 25 then are actuated and carry the blank to a position in front of die 40. It will be noted that while the punches in gate B are moving in their forward stroke (see Fig. 7), the transfer fingers 25 with the blank 14b is moving from station 21 toward station 26 in a revolving motion. After the transfer fingers reach their position in front of die 40 in the second forging operation station 26, the punch 30 drives the blank 14b into die cavity 41, the blank having been rotated 180° so that face 28 is next to the punch 30. Fig. 7 shows the relative positions of the parts when the punches have moved about halfway on their forward stroke and Fig. 8 shows the relative positions of the parts when the punches have completed their forward stroke.

In the second forging operation at station 26, the blank is forced into a die 40 having die cavity 41 hexagonal in cross section and spherodially shaped at its bottom end. The nose of punch 30 is shaped so that it forces the metal to flow into the corners of the die cavity 41 and into the spherical part of the die insert 40a and to make a blind hole in the blank. This operation produces a blank 14c as shown in Figs. 1C and 2C. The main purpose and effect of this second forging operation is to pre-form the hole 42c, to partially shape the blank into hexagonal form and to preform the spherical part of the blank, which in the succeeding operations, becomes the round or crown portion of the nut. (See Fig. 2C).

Continuing the cycle, the blank 14c is knocked out of the die 40 by the second operation knock-out pin 43, after the punch 30 is retracted. When the knock-out pin 43 is actuated in timed relation with the other elements of the machine, the transfer fingers 44 will have been returned to pick-up position in front of die 40 (see Fig. 6) to receive the blank 14c from the die 40. However, transfer fingers 44 do not operate in revolving fashion, as do transfer fingers 25, but move directly in straight line between station 26 and the next succeeding third forging operation station 45. The reason for the straight line transfer is to present the blank 14c to the die 46 in the third forging operation station 45 in such a way that the spherical part or closed end of the blank 14c will enter the spherical part of the die cavity 47 of die 46.

At station 45, the third operation punch 50 pushes the blank 14c out of the transfer fingers 44 and forces it into the die cavity 47 causing the metal to flow against the die and forming the blank into the shape shown in Figs. 1D and 2D. It will be observed that in the third operation the metal of blank 14c has been forged so that a crown 51, generally of the shape of the finished blank 14f, has been formed. Also, the open end of the nut has been hexed; that is, forged to hexagon shape. It will also be noted that the blind hole 42c in blank 14c is of a shape generally like a frustum of a cone, whereas the punch 50 is shaped to form in blank 14d a blind hole 42d, having a cylindrical shaped portion and terminating at its inner end is a shape like a frustum of a cone.

Transfer fingers 53, operate between the third operation station 45 and the fourth operation station 55. These transfer fingers operate in revolving fashion as do the transfer fingers 25. When the transfer fingers 53 are returned to pick-up position (see Fig. 6), in timed relation to the other parts of the machine, the knock-out pin 56 is actuated to push the blank 14d out of die 46 into these transfer fingers. The knock-out pin 56 is provided with a helical compression spring 57 to aid the retraction of pin 56 after it has pushed the blank 14d into the transfer fingers 53.

When the blank 14d has been grasped by transfer fingers 53 the gate B, mounting the punches is ready for another forward stroke. The blank 14d is then carried by the finger 53 in revolving fashion to the front of die 58 in the fourth operation station 55.

In this fourth forging operation, the blank 14d is pushed from the transfer fingers 53 by a spring biased pin 60 which is a part of and is reciprocatable in the fourth operation punch 61. Compression spring 62 mounted in a longitudinal center bore 63 normally urges the pin 60 outwardly from the punch 61. The punch 61 is larger in cross section than the other punches. It has a spherically shaped cavity 64 at its nose end. That is, the cavity 64 is in intaglio in the end of punch 61. This is shown best perhaps in Figs. 12 and 13. Inasmuch as the punch is larger in cross section than the blank it is necessary that the transfer fingers 53a and 53b be spread apart to permit the punch 61 to enter between them for accomplishing its function in the forging operation. This spreading action is done by the punch itself, it being noted that on the forward stroke of the gate B, the punch 61 moves forward with the pin 60 moving slightly in advance of the hollowed cup-shaped nose of the punch 61. Consequently, when the pin 60 engages the surface of the crown or closed end of the nut blank, the blank is pushed out of the fingers 53 and immediately the bevel 65 on the nose of pin 60 engages the complementary bevel 66 on the fingers. As the punch continues on its forward stroke it spreads the fingers 53a and 53b apart to permit the nose of punch 61 to engage the outside surface of the crown of the nut blank with a forging blow and thus forge the crown part, while in the meantime the hex part 66 of the blank has entered the cavity 67 of the die 58. The die cavity 67 is shaped to produce the washer face 68 such as shown in Fig. 3 and the blank in the fourth forging operation is forged to the shape shown in Figs. 1E and 2E. Fig. 12 shows the position of the blank in die 58 after it has been moved out of the transfer fingers by pin 60 and shows the punch 61 prior to the time it has struck the blank to forge it to form the crown and the washer face. Fig. 13 shows the position of the blank and forging punch 61 after it has struck the blank and shows how the metal of the blank has flowed to form the washer face as shown in Fig. 2E. It will be observed in Fig. 13 that the transfer fingers 53a, 53b have been spread apart to permit entry of the punch 61.

The fourth operation die 58 is a hex die having a hex insert 69 pressed into it. By changing the form of the end face of this insert or by insertion of interchangeable die inserts having the desired form of end face, it is possible by means of the fourth forging operation to produce different types of acorn nuts such as illustrated by the washer faced nut blanks 14f or the double chamfered nut blank 14g (Fig. 4) or the flat faced nut blank 14h (Fig. 5).

After the fourth forging operation has been completed, the blank now in the form illustrated in Figs. 1E and 2E, and now designated as blank 14e is pushed out of the die cavity 67 of die 58 by the fourth operation knock-out pin 70. It will be noted that the apron part 66 of blank 14e is narrower, that is, less in height, than the apron part 81 of the blank 14d. That is, the height of the apron 66 (flat faces 66) of blank 14e is less than the height of the corresponding apron 81 (flat faces 81) of the blank 14d. It will be understood that in the meantime the transfer fingers 53 will have returned to station 45 on the return stroke of the punch 61. Also the transfer fingers 71 which operate between station 55 and the final or fifth operation station 72 will be positioned in front of die 58 to receive the blank 14e (see Fig. 6). The transfer fingers 71 are also of the revolving type as are the transfer fingers 25 and 53.

The blank 14e is delivered by the revolving transfer fingers 71 to the front of the die 73. Consequently the closed end or crown of the nut blank (not the open end) is positioned next to this die. The die 73 has a closed end spherically shaped cavity 74 having a smooth surface and it has a hex shaped entrance 75. The spherically shaped cavity 74 has a radius corresponding to the radius of the spherically shaped crown 76 of the finished nut blank 14f. The hex entrance 75 of die 73 aids in positioning the blank in the die for the forging operation. In this fifth and final forging operation it is not necessary to introduce the blank all the way into the die 73 since the hex part 66 of the nut has already been formed in the previous forging operations.

The nut blank is forged to its final form in the fifth operation. The fifth operation punch 77 in its forward stroke pushes the blank 14e into the die cavity of die 73. It has a nose 78 which sizes the blind hole 42f (see Fig. 2F) and this punch causes the metal to flow into the spherical die cavity 74 which gives the blank its finished size. The spherical crown surface 76 is perfectly smooth and free from the circular flat surface 79 which existed on the blank 14e left by the pin 60. The bore or well 42f (see Fig. 2F) has a substantially cylindrical surface, and is ready to be tapped in conventional manner to provide the internal threads of the finished acorn nut.

After completion of the fifth forging operation in die 73, the fifth operation punch 77 is retracted on the rearward stroke of punch gate B. Due to the friction between the wall of the hole 42f and the punch, the punch carries with it the nut blank, now designated 14f. (See Fig. 9.) The nut blank 14f is then stripped from the punch 70 by a stationary stripper 80 of known construction. The finished blank 14f falls into a receiver and is now ready for the tapping operation, which is done in conventional manner to complete the finished internally threaded acorn nut.

If a washer face nut such as 14f is desired, or a double chamfered nut, such as 14g, or a flat face nut, such as 14h, this can be produced by insertion of the appropriate insert, such as 69, in the fourth operation station.

The terms and expressions which have been employed herein are used as terms of description and not of limitation and there is no intention in the use of such terms and expressions of excluding any equivalent of the features shown and described, or portions thereof, but it is recognized that various modifications are possible within the scope of the invention claimed.

What is claimed is:

1. The method of die-forming a cylindrical slug of steel metal into an acorn nut which consists of forging the slug in successive cold forging operations, comprising forming, in a plurality of forging operations, a dome shaped nut blank, having a tapered blind hole closed at one end by said dome and open at its other end and a hex shaped apron, then introducing said blank into a die having a cavity with a hex shaped side wall and a bottom corresponding to the shape of the open end of the finished nut, said blank being presented to said die cavity with its open end toward said bottom, then applying a compressive force to the exposed dome part of said blank by a punch having a dome shaped cavity in its end face, thereby to form a blank having a dome, a hex apron, a tapered blind hole and a face corresponding to the face of the finished nut, then transferring said blank to a final die having a dome shaped cavity presenting a smooth uninterrupted surface, corresponding to the shape of the dome of the finished nut and a hex entrance, said blank being presented to said die with its blind end toward said cavity and its open end away from said cavity, then applying a compressive force to said blank by a punch having a nose of substantially cylindrical shape entering said blind hole, thereby in said last forging operation to form an acorn nut blank having a dome shaped crown with a smooth exterior surface free from flat areas and pin marks, a hex apron and a substantially cylindrical blind hole therein, then removing said blank from said die and tapping the blind hole to form an internally threaded acorn nut having a smooth exterior crown surface free from flat areas and indented tool marks.

2. The method of forming an acorn nut blank which comprises the steps of cutting a cylindrical blank from bar stock, then in a first forging operation, pressing the cylindrical blank in a first die thereby to smooth the ends of said cut blank, transferring the blank to a second die having a generally dome shaped cavity, then in a second forging operation applying compressive force to the blank in said second die to form the blank into a shape having a generally hex cross section and having a dome and having a blind hole, then transferring the blank to a third die having a generally dome shaped cavity and a hex shaped entrance, then in a third forging operation applying compressive force to the blank in said third die to form the blank into a shape having a dome and a generally hex shaped apron and having a tapered blind hole, then transferring the blank to a fourth die having a die cavity with hex shaped side walls with the open end of the blank entering the die, then in a fourth forging operation applying a compressive force to the blank in said fourth die to form the blank into a shape having a spherical dome and a hex shaped apron, said compressive force in said fourth forging operation being applied by a punch having a dome shaped end in intaglio, then transferring the blank to a fifth die having a dome shaped cavity corresponding to the shape of the finished blank and an entrance having a hex shape, and presenting said blank to said fifth die with its blind end entering said die cavity, then in a fifth forging operation applying a compressive force to said blank, said force in said fifth forging operation being applied by a punch having a nose of substantially cylindrical shape, thereby to form in said fifth forging operation an acorn nut blank with a crown having a spherical and smooth external surface, a hex apron and a blind hole having a substantially cylindrical wall, then removing said blank from said fifth die, thus forming an acorn nut blank having a smooth exterior forged surface and a blind hole ready to be tapped.

3. The method of forming an acorn nut which comprises the steps of cutting a cylindrical blank from bar stock, then in a first forging operation, pressing the cylindrical blank in a first die thereby to smooth the ends of said nut blank and form an annular bevel at one end, transferring the beveled blank to a second die having a generally dome shaped cavity, then in a second forging operation applying compressive force to the blank in said second die to form the blank into a shape having a crown and having a blind hole, then transferring the blank to a third die having a generally dome shaped cavity and a hex shaped entrance, then in a third forging operation applying compressive force to the blank in said third die to form the blank into a shape having a dome and a generally hex shaped apron having six flat faces and having a tapered blind hole, then transferring the blank to a fourth die having a die cavity with hex shaped side walls with the open end of the blank entering the die, then in a fourth forging operation applying a compressive force to the blank in said fourth die to form the blank into a shape having a spherical dome and a hex shaped apron having six flat faces, said last mentioned flat faces being of less height than the height of the corresponding flat faces formed in said third forging operation, said compressive force in said fourth forging operation being applied by a punch having a dome shaped end in intaglio, then transferring the blank to a fifth die having a dome shaped cavity corresponding to the shape of the finished blank and an entrance having a hex shape, and presenting said blank to said fifth die with its blind end entering said die cavity, then in a fifth forging operation applying a compressive force to said blank, said force in said fifth forging operation being applied by a punch having a nose of substantially cylindrical shape, thereby to form in said fifth forging operation an acorn nut blank with a crown having a spherical and smooth external surface, a hex apron and a blind hole having a substantially cylindrical wall, then removing said blank from said fifth die, thus forming an acorn nut blank having a smooth exterior forged surface and a blink hole ready to be tapped and then tapping the blank.

4. A method according to claim 3 in which the bottom end of said fourth die has an annular flat intaglio cavity for forming on the open end of said blank a washer face and in which a washer face is formed on said blank in said fourth forging operation thereby to produce a washer face acorn nut.

5. A method according to claim 3 in which the bottom end of said fourth die has a chamfer at its periphery for forming a chamfer on the end of said blank and in which a chamfered end is formed on said blank in said fourth forging operation thereby to produce a chamfered end acorn nut.

References Cited in the file of this patent

UNITED STATES PATENTS

| | | |
|---|---|---|
| 1,867,229 | Nelson | July 12, 1932 |
| 2,090,641 | Rosenberg | Aug. 24, 1937 |
| 2,287,214 | Wilcox | June 23, 1942 |
| 2,542,864 | Friedman | Feb. 20, 1951 |